US 6,709,688 B1

(12) United States Patent
Breivik et al.

(10) Patent No.: US 6,709,688 B1
(45) Date of Patent: Mar. 23, 2004

(54) PIGMENT

(75) Inventors: Harald Breivik, Skjelsvik (NO); Lola Irene Sanna, Porsgrunn (NO); Berit Annie Aanesen, Skien (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/959,238

(22) PCT Filed: Apr. 17, 2000

(86) PCT No.: PCT/NO00/00129

§ 371 (c)(1),
(2), (4) Date: Feb. 4, 2002

(87) PCT Pub. No.: WO00/62625

PCT Pub. Date: Oct. 26, 2000

(30) Foreign Application Priority Data

Apr. 19, 1999 (NO) .............................................. 991857

(51) Int. Cl.⁷ ................................................ A23L 1/27
(52) U.S. Cl. ...................... 426/250; 426/262; 426/268; 426/805
(58) Field of Search ................................. 426/250, 262, 426/268, 805

(56) References Cited

U.S. PATENT DOCUMENTS

| | | | | |
|---|---|---|---|---|
| 4,871,551 A | * | 10/1989 | Spencer | 426/2 |
| 5,959,138 A | * | 9/1999 | Torres-Cardona et al. | 560/190 |
| 6,054,491 A | * | 4/2000 | Lignell et al. | 514/725 |
| 6,265,450 B1 | * | 7/2001 | Asami et al. | 514/691 |
| 6,579,714 B1 | * | 6/2003 | Hirabayashi et al. | 435/292.1 |
| 2002/0110604 A1 | * | 8/2002 | Babish et al. | 424/725 |

FOREIGN PATENT DOCUMENTS

| | | | |
|---|---|---|---|
| EP | 0322114 | * | 5/1989 |
| JP | 60054647 | * | 3/1985 |
| JP | 01202261 | * | 8/1989 |
| JP | 01218593 | * | 8/1989 |
| JP | 07300421 | * | 11/1995 |
| WO | 96/12415 | * | 5/1996 |

OTHER PUBLICATIONS

Tsukuda et al., Tokaiku Suisan Kenkyusho Kenkyu Hokoku, vol. 77, pp. 89–95, 1974.*
Englert et al., Helv. Chim.Acta, vol. 63(6), pp. 1711–1718, 1980.*
Kienzle et al., Helv.Chim. Acta, vol. 61(7), pp. 2609–2615, 1978.*
Grung et al., Journal of Applied Phycology, vol. 4(2), pp. 165–171, 1992.*
File WPI, Derwent accession No. 1991–145985, Dainippon Ink & Chem KK: "Prepn. of crushed plant material for use as foodstuff, etc.–by culturing e.g. haematococcus producting astaxhanthin(s), drying and crushing". (Apr. 1991) JP 3083577.
Virtue, P., et al. "Biochemical composition of *Nyctiphanes australis* and its possible use as an aquaculture feed source: lipids, pigments and fluoride content", Marine Biology, vol. 122 (1995), pp. 121–128.
Sakado, K., et al. "Feeds containing astaxanthin fatty acid esters for red–skin fishes and culture of the fishes using the feeds", CA 112:117751 (1990).
Schiedt, K., et al. "Absorption, retention and metabolic transformations of carotenoids in rainbow trout, salmon and chicken", CA 103:36530 (1985).

\* cited by examiner

*Primary Examiner*—Chhaya Sayala
(74) *Attorney, Agent, or Firm*—Wenderoth, Lind & Ponack, L.L.P.

(57) ABSTRACT

This invention relates to a new pigment in feed for salmonides, a new feed comprising this pigment and use of this pigment. The pigment comprises a diester of astaxanthin prepared with an omega-3 fatty acid and/or a short chain carboxylic acid. By this invention a pigment for feed to salmonides that is more stable and biologically more effective than free astaxanthin and commercially available astaxanthin product, is provided.

13 Claims, No Drawings

PIGMENT

This application is a 371 application of PCT/NO00/00129 filed Apr. 17, 2000.

This invention relates to a new pigment in feed for salmonides, a new feed comprising this pigment and use of the pigment.

In feed for farmed salmon and trout pigment has to be added to obtain the desired colour of the fish flesh. The pigment mostly used is astaxanthin which corresponds to the pigment which is available in feed for wild salmonides. Also other pigments like for instance cantaxanthin, might be used. Such pigments are very unstable with regard to exposure to air and temperature as well as light. The pigments are therefore to a great extent degraded during feed processing and storage. These pigments are all carotenoids. This feed is mostly prepared from raw material not containing significant amounts of astaxanthin (i.e. white fish). Farmed salmon and trout is fed industrially manufactured feed where pigment is added.

Commercially available astaxanthin products are furthermore very expensive and their biological retention is very low. Astaxanthin is as mentioned above a rather unstable compound, which of course is a drawback. The low stability of astaxanthin is due to oxidation. Commercial pigment products are formulated in order to avoid or reduce oxidation. One typical formulation for astaxanthin is with gelatine and starch. The formulations used are often, however, not optimal with respect to biological availability of the pigment, and a new way of solving the stability problem, combining a high degree of stability with improved biological availability would be of great economical benefit to the aquaculture industry. A more stable pigment Is thus highly desired as this would give possibilities for making a formulation more optimal with regard to biological availability and consequently possibilities for considerably economic saving.

Thus it is a desire in the aquaculture industry to find more stable and biologically effective pigments useful in production of feed for salmonides.

The different salmonid species differ in their ability to utilise dietary carotenoid. Rainbow trout (*Oncorhynchus mykiss*) has been found to utilize the pigment in the feed more effectively than Atlantic salmon (Salmo salar) and sea trout (*S. trutta*).

Rainbow trout can also accumulate higher amounts of carotenoids in the flesh than Atlantic salmon and sea trout, but less than sockeye salmon (*Oncorhynchus nerka*) (Storebakken, T. and Ho, N. K., Aquaculture, vol. 100, (1992), p. 209).

In salmon, dietary astaxanthin and canthaxanthin are deposited more efficiently in flesh than in skin, which is in contrast to the rainbow trout (Schiedt, K. et al., Pure & Appl. Chem. 57 (1985) 685–692).

Synthetically produced astaxanthin is normally present in unesterified form (i.e. diol). This is also the form assumed that the pigment is converted to in the intestine before it is absorbed by the fish (O. J. Torrissen et al., Reviews in Aquatic Sciences, vol. 1, (1989) pp. 209–225). In nature astaxanthin is often present as diester.

Simpson, K. L. and Kamata, T., Proc. World Symp. on Finfish Nutr. and Fishfeed Technology, Hamburg. Jun. 20–23, 1978. Vol II. Berlin 1979, pp. 415–424, reported a study for pigmentation of rainbow trout comparing astaxanthin, astaxanthin ester and astacene. Astaxanthin, astaxanthin ester and astacene were extracted from shrimp coagulum. The pigments were dissolved in herring oil and added to the trout diet. When analysing the fish, no distinction was made between flesh and skin. The fish fed the diet consisting of astaxanthin ester contained much higher levels of total astaxanthin than others. This indicated that astaxanthin ester was more effective for the pigmentation of rainbow trout. However, on the same symposium Torrissen, O. and Braekkan, O. R. (Proc. World Symp. on Finfish Nutr. and Fishfeed Technology, Hamburg. Jun. 20–23, 1978. Vol II. Berlin 1979, pp 377–382) also demonstrated that astaxanthin was incorporated into the flesh of rainbow trout. These authors found that astaxanthin was more effectively incorporated in flesh than diesters and monoesters purified from the copepod, *Calanus finmarchicus*.

According to O. J. Torrissen et al., Reviews in Aquatic Sciences, vol.1, (1989) pp. 209–225 (i.e.: Foss, P. et al., Aquaculture, vol. 65, (1987), p.293 and Storebakken, T. et al., Aquaculture, vol. 65, (1987), p. 279) synthetic astaxanthin diester (i.e. astaxanthin dipalmitate) seems to be absorbed less easy than free astaxanthin both in rainbow trout, sea trout and Atlantic salmon.

In crustaceans, a relatively large part of the astaxanthin is present in ester form. However, the pigment is more easily absorbed than what should be expected from the level of free astaxanthin. This is in O. J. Torrissen et al., Reviews in Aquatic Sciences, vol. 1, (1989) pp. 209–225 tentatively explained from other not identified compounds in crustacea which might contribute to enhanced absorption.

To summarise: as astaxanthin absorption in the intestine of the fish is assumed to involve free astaxanthin (i.e. diol) it is so far mainly considered that feeding with esters will give less biological absorption than feeding with free astaxanthin. This is supported by experiments with astaxanthin dipalmitate.

It is known that astaxanthin present as diester is more stable than free astaxanthin (Omara-Alwala, T. R. et al., J. Agric. Food Chem., vol. 33 (1985), p. 260 and Arai, S. et al., Aquaculture, vol. 66 (1987), p. 255.)

In the literature, dipalmitate is the predominant diester studied, and it is reported to give less pigmentation than the diol (Torrissen, O. and Braekkan, O. R.; Proc. World Symp. on Finfish Nutr. and Fishfeed Technology, Hamburg Jun. 20–23, 1978. Vol II. Berlin 1979, pp. 377–382, Storebakken, T. et al., Aquaculture, vol. 65 (1987), p. 279, Foss, P. et al., Aquaculture vol. 65 (1987), p. 293, Torrissen, O. J et al., CRC Crit. Rev. Aqua. Sci. vol. 1 (1989), p. 209. ). This is explained by a low degree of hydrolysis of the diester.

We have shown that by using a commercial lipase (*Candida rugosa*), after 42 hours the dipalmitate hydrolysed to 40% free astaxanthin. We synthesised several other diesters in order to study whether these hydrolysed faster than the dipalmitate. Example 1 shows that under the same experimental conditions the diester with elaidic acid (trans-C18:1) hydrolysed to a higher degree (73%) while a short-chain carboxylic acid (C10:0) hydrolysed somewhat slower, and a diester prepared with a concentrate of omega-3 fatty acids comprising approx. 50% EPA (all cis C20:5 n3) and approx. 35% DHA (all cis C22:6 n3) (in total more than 90% omega-3 fatty acids) (EPA+DHA) hydrolysed to free astaxanthin at less than half the rate of the dipalmitate.

To verify the hydrolysis data for these astaxanthin diesters obtained by using the commercial lipase, another similar experiment was performed by using enzyme isolated from the intestine of Atlantic salmon. This experiment very surprisingly gave opposite data than the data obtained in the experiment where the commercial lipase was used; i.e. the EPA+DHA diester was hydrolysed quickest and the dielaidate and the dipalmitate were hydrolysed slowest (see Example 2). Thus the inventors most surprisingly have found that if astaxanthin esterified with a concentrate of omega-3 polyunsaturated fatty acids is hydrolysed by enzyme from the intestine of salmon, a surprisingly fast hydrolysis to free astaxanthin is obtained compared to dipalmitate. Surprisingly, also diester with the short chain carboxylic acid (C10:0) was hydrolysed much faster than the dipalmitate, even though the rate of hydrolysis was significantly slower than hydrolysis of the EPA+DHA diester.

Based on these surprising data, the present inventors have found a astaxanthin EPA+DHA diester which most likely hydrolyses quickly to free astaxanthin when fed to the salmon and thus is effective for pigmentation of salmon. In Example 3 it is shown by feeding experiments that this statement is correct. In a similar way, the inventors have found that an astaxanthin diester with short chain carboxylic acids will be suitable as a pigment with good stability and a high potential for pigmentation of salmonides.

Furthermore, it was surprisingly found by the inventors that the EPA+DHA diester comprised acceptable stability properties for use in industrially manufactured feed without formulation with gelatine or starch (see Example 3). This was not expected, as omega-3 polyunsaturated fatty acids are unstable compounds.

In Example 3 pigmentation of salmon with the EPA+DHA diester was compared to pigmentation with a commercial free astaxanthin product (Carophyll Pink, Roche). Most surprisingly, it was found that the bioavailability as measured by astaxanthin uptake in salmon fillet was 41% higher in the fish fed the EPA+DHA diester compared with the fish fed the commercial pigment. Thus, feeding with this astaxanthin diester surprisingly gives enhanced biological absorption compared to free astaxanthin.

It is a main object of the invention to provide a pigment for feed to salmonides that is more stable and biologically effective than free astaxanthin and commercial pigments for salmonides.

Another object of this invention is to provide a pigment which can be added to the feed in less amounts than previously known pigments and still give a satisfactory pigmentation of the flesh.

This and other objects are achieved by the attached claims.

The invention is further explained by examples.

EXAMPLE 1

Diesters of astaxanthin were prepared with the following carboxylic acids: elaidic acid (trans-C18:1), palmitic acid (C16:0), decanoic acid (C10:0) and a concentrate of omega-3 fatty acids comprising approximately 50% eicosapentaenoic acid (EPA) (all cis C20:5 n3) and approximately 35% docosahexaenoic acid (DHA) (all cis C22:6 n3). The different diesters were firstly hydrolysed by a commercial lipase, *Candida rugosa* (Lipase AY, 30). This reaction gave the following results after 42 hours at room temperature:

| Diester | Free astaxanthin (%) |
| --- | --- |
| 18:1 | 73 |
| 16:0 | 40 |
| 10:0 | 30 |
| EPA + DHA | 18 |

These results show that the diester with polyunsaturated fatty acids is hydrolysed more slowly than corresponding diesters with saturated or monounsaturated fatty acids.

Based on this experiment, the esterification with an omega-3 concentrate gives slower hydrolysis to free astaxanthin, and one should therefore expect lower biological uptake than in feeding experiments with astaxanthin dipalmitate that have been described in the literature.

EXAMPLE 2

A similar experiment as Example 1 was performed with enzymes from salmon intestinal fluid. The intestinal fluid from salmon was collected as described from cod (Lie, Ø. et al., Comp. Biochem. Physiol., 80B (3), (1985), pp. 447–450). The following results were obtained after 45 hours at room temperature:

| Diester | Free astaxanthin (%) |
| --- | --- |
| 18:1 | 1 |
| 16:0 | 1 |
| 10:0 | 6 |
| EPA + DHA | 25 |

Surprisingly, here a considerably higher conversion to free astaxanthin from the EPA+DHA-diester was obtained than from the other diesters. The dielaidate and the dipalmitate were after 45 hours hydrolysed to a degree of just 1%, while the didecanoate was hydrolysed to a degree of 6% and the EPA+DHA diester to a degree of 25%. These results were most unexpectedly opposite of those from Example 1. It is hereby shown that a higher biological uptake than what was achieved in the experiment with astaxanthin diesters that has been described in the literature, probably will be obtained when feeding with an astaxanthin diester prepared with either a concentrate of omega-3 fatty acids or a short chain carboxylic acid.

EXAMPLE 3

The EPA/DHA astaxanthin diester (ACD) from Example 1 and 2 (30 mg/kg calculated as free (i.e. unesterified) astaxanthin) was added to the pellet by pilot plant production of fish fodder. Urea (2% weight relative to fish oil) was added with water during extrusion. The addition of pigment and fat/oil was done by vacuum-coating of the extruded pellet. The EPA+DHA diester was added together with the fish oil. 200 mg/kg ascorbic acid had been added to the fish oil. After production, a weight average of 18.4 mg/kg was recovered in the pellet (18.1 mg/kg as diester, and approx. 0.3 mg/kg as hydrolysed ester). This shows that the EPA+DHA diester survives the production process in sufficient degree to be utilised in practical feeding of fish. Several batches of this fodder composition was produced. Detailed analytical data are given in the calculation below.

Commercial astaxanthin (Carophyll Pink, Roche, 30 mg/kg calculated as free astaxanthin) was added to fish fodder in the same manner as above. In this commercial product unesterified astaxanthin is finely dispersed in a stach-covered matrix of gelatine and carbohydrates. Ethoxyquin and ascorbyl palmitate are added as antioxidants. The process and raw materials, including urea addition, were identical with what is given above, with the exception that the fish oil contained no ascorbic acid. After production, a weight average of 25.0 mg/kg free astaxanthin was recovered in the pellet. Several batches of this fodder composition was produced. Detailed analytical data are given in the calculation below.

The two fodder compositions were given to salmon. Initially, the average weight of the fish was 70 g. In the calculations that follow, we do not include pigment content of fish before feeding started. The values were identical for both groups, and the numerical values are so small that they will not be significant for the conclusions.

After 8 months the average weight of 20 fish for each group was 1180 g for the fish fed with astaxanthin diester, and 1153 g for the fish fed with commercial pigment. The average astaxanthin content of the fish fillet was 3.34 mg/g for the fish fed with the diester and 3.23 mg/g for the fish fed with commercial pigment. If we assume that the fish weight consisted of 70% muscle, we have the following average values for astaxanthin content:

Fish fed with astaxanthin diester: 1.180 kg/fish×0.70× 3.34 mg/kg=2.76 mg

Fish fed with commercial astaxanthin: 1.153 kg/fish× 0.70×3.23 mg/kg =2.61 mg

The fish fed with astaxanthin diester had received the following fodder:

| | |
|---|---|
| 457.4 kg containing 18.4 mg/kg = | 8416 mg |
| 97.6 kg containing 17.1 mg/kg = | 1669 mg |
| 32.6 kg containing 17.9 mg/kg = | 584 mg |
| Sum = | 10669 mg |

Divided by the average number of fish during the study, each fish had received:

| | |
|---|---|
| 10669 mg/762 = | 14.00 mg astaxanthin. |
| This gives a bioavailability of 100% × 2.76 mg/14.00 mg = | 19.7%. |

The fish fed with commercial astaxanthin had received the following fodder:

| | |
|---|---|
| 463.2 kg containing 25.0 mg/kg = | 11580 mg |
| 101.0 kg containing 24.8 mg/kg = | 2505 mg |
| 32.5 kg containing 30.0 mg/kg = | 976 mg |
| Sum = | 15061 mg |

Divided by the average number of fish during the study, each fish had received:

| | |
|---|---|
| 15601 mg/775 = | 20.13 mg astaxanthin. |
| This gives a bioavailability of 100 × 2.61/20.13 = 13.0%. | |

Thus feeding with ACD surprisingly gives enhanced biological absorption compared to tree astaxanthin.

EXAMPLE 4 and 5

Isolation of Crude Enzyme Mixtures From Salmon and Trout Intestine

Tris buffer (0.25 M) solution was prepared by dissolving Tris (4.54 g; 37.5 mmol) in 150 ml of distilled water. The pH of the buffer solution was adjusted to 8.0 by adding 2 M hydrochloric acid. All the hydrolysis was done at room temperature so no special effort was necessary.

The astaxanthin diester was weighed accurately (~40 mg, 33 mmol) along with 2.5 g of chremophor EL emulsifier (from BASF) into 100 ml Erlenmeyer flask. The solution was stirred vigorously for 20 minutes (until homogeneous) and then 20 ml of the Tris buffer was added and stirred for additional 10 minutes. The solution was suction filtered and the red filtrate was poured into 25 ml volumetric flask and diluted to the mark with buffer. Concentration of all the solution was determined spectrophotometically (492 nm) to be about 1 mg/ml, except for diacetate which was obtained in a lower concentration. All the solutions were stored in refrigerator wrapped in aluminium paper.

Isolation of the Crude Enzyme Mixture

Fresh salmon and rainbow trout, that had been fed in the last 12 hours, were obtained from local fish farms. At the laboratory the fresh fish was cut open and the crude enzyme mixture extracted as follows: From the digestion line there were a lot of narrow tubes surrounded by fat tissue. Each of them was cut off and extracted by hand into a cooled container. The viscous solution (~50 ml) was diluted to 100 ml with 0.25 M Tris buffer and stirred for 30 minutes in an ice bath. Next step was centrifugation at 11.000 rpm for 20 minutes at 4° C. (RC5C from Du Pont). The water layer was extracted by pipette to another centrifuge glasses and the centrifugation repeated at 18.000 rpm for 30 minutes at 4° C. The water layer was transferred to Erlenmeyer flask and quickly frozen by liquid nitrogen. Before starting the reaction the mixture was thawed and purified by ultracentrifuge at 27.000 rpm for 45 minutes at 4° C. (157.000 g at top). The lipase preparation was obtained as a clear yellow solution.

Hydrolysis

Into a 10 ml round bottom flask was added 2 ml of stock solution and 3 ml of crude enzyme mixture from fish intestine. The flask was filled with nitrogen before closing, wrapped in aluminium paper and stirred for 48 hours. When finished, all the water was removed under reduced pressure (0.01 Torr) and redissolved in $CH_2Cl_2$. The solution was filtered through cotton wool plug and stored under nitrogen in a closed container. Analytical TLC was used to monitor the progress of the reaction with 5% acetone in $CH_2Cl_2$ as eluent (Diol($R_f$=0.0–0.1), Monoest. ($R_f$=0.3–0.5), Diest. ($R_f$=0.8–0.9)). To determine the degree of hydrolysis all the samples were injected into analytical HPLC. [Eluent: 30% acetone in n-hexane. Column: Nucleosil 50–5 (2×30 cm) column. Flow rate: 0.15 ml/min. Detector: 470 nm (Diol $R_f$=0.4–0.5, Monoest. $R_f$=0.7, Diest. $R_f$=0.9–1.0)].

EXAMPLE 4

A similar experiment as in Example 2 was performed with enzymes from salmon intestinal fluid.

The diesters that were hydrolysed were prepared by esterification of astaxanthin with the following carboxylic acids:

Acetic acid, C16:0 (palmitic acid), fatty acids from a fish oil rich in omega-3 fatty acids (approx. 18% EPA and 12% DHA, called K30 in the tables below), a concentrate of omega-3 fatty acids (approx. 30% EPA and 20% DHA, called K55 in the tables below), the same concentrate of EPA and DHA as used in example 2 (approx. 50% EPA and 35% DHA, called ACD in the tables below), purified EPA (more than 95% EPA, called EPA in the tables) and purified DHA (more than 90% DHA, called DHA in the tables).

Table 1 shows the degree of hydrolysis after 48 hours hydrolysis with crude enzyme mixture from salmon intestine.

After 48 hours the diester of astaxanthin with palmitic acid (16:0) had resulted in no free astaxanthin. However, it is known from the prior art, that this diester is hydrolysed in salmon and gives rise to an increased level of pigment in the fish. Thus, this result indicates that the crude enzyme preparation was not in an optimal condition, presumably due to proteases which may act to degrade the needed enzymes.

All other diesters with omega-3 fatty acids or a short chain carboxylic acid (acetat) gives rise to a higher hydrolysis of diester to diol compared to the diester of astaxanthin with palmitic acid and will therefore be expected to give rise to a higher uptake of pigment in the fish.

The highest degree of hydrolysis was observed with the diester ACD (9%). The relative amount of free astaxanthin was three times as high as that from the diester of a lower concentrated fish oil (K30). The results further show that the diester of purified EPA is hydrolysed faster than the diester of DHA. However, surprisingly the concentrate of EPA and DHA called ACD is hydrolysed faster than purified EPA. The diester of acetic acid is hydrolysed to 7% free astaxanthin. However, it should be noted that for this compound only 13% remains as diester when the reaction is ended. This is much lower then for the other products that were tested, and indicates that if the reaction time had been prolonged, a high amount of free astaxanthin would have been obtained from this diester. Similarly, the only 27% of the diester of EPA remains unreacted. Accordingly, under in vivo conditions, it is expected that the diesters may show even higher relative degree of hydrolysis to free astaxanthin than what is demonstrated in table 1.

EXAMPLE 5

A similar example as Example 2b was performed. However, for this Example crude enzyme preparation from rainbow trout (*Oncorhynchus mykiss*) was used. The results are shown in Table 2. Table 2 demonstrates that after 48 hours 71% of the diester of palmitic acid remained unreacted. For the fish oil 37% was unreacted, while for ACD only 14% remained unreacted. As for salmon, we observe that EPA reacts faster than DHA (17 and 21% unreacted), however for rainbow trout we observe that an omega-3 concentrate like the ACD diester gives higher degree of hydrolysis than the diester of purified EPA. Only very small amounts of diester of acetic acid (3%) remains, indicating that a diester of astaxanthin with a short chain carboxylic acid will give very rapid hydrolysis in fish intestine.

These results are confirmed by looking into the relative amounts of free astaxanthin in table 2. Here ACD shows the highest results, with 27% free astaxanthin, compared to only 11% for the diester of palmitic acid.

The results in Tables 1 and 2 below support the conclusions that an astaxanthin diester with a concentrate of omega-3 acids or an astaxanthin diester with short chain carboxylic acids will give higher biological uptake in farmed fish than experiments with astaxanthin diesters that have been described in the literature.

TABLE 1

Ratio (%) between astaxanthin diester, monoester and diol, after 48 hours hydrolysis with crude enzyme mixture from salmon intestine.

| Substrate | Diesters (%) | Monoesters (%) | Diol (%) |
|---|---|---|---|
| Acetate | 13 | 80 | 7 |
| 16:0 | 81 | 19 | 0 |

TABLE 1-continued

Ratio (%) between astaxanthin diester, monoester and diol, after 48 hours hydrolysis with crude enzyme mixture from salmon intestine.

| Substrate | Diesters (%) | Monoesters (%) | Diol (%) |
|---|---|---|---|
| K30 | 61 | 36 | 3 |
| K55 | 42 | 52 | 6 |
| ACD | 37 | 54 | 9 |
| EPA | 27 | 67 | 6 |
| DHA | 44 | 53 | 3 |

TABLE 2

Ratio (%) between astaxantin diester, monoester and diol, after 48 hours hydrolysis with crude enzyme mixture form rainbow trout intestine.

| Substrate | Diesters (%) | Monoesters (%) | Diol (%) |
|---|---|---|---|
| Acetate | 3 | 83 | 14 |
| 16:0 | 71 | 18 | 11 |
| K30 | 37 | 46 | 17 |
| K55 | 25 | 52 | 23 |
| ACD | 14 | 59 | 27 |
| EPA | 17 | 58 | 25 |
| DHA | 21 | 55 | 24 |

The concentrate of omega-3 fatty acids comprising approximately 50% eicosapentaenoic acid (EPA) and approximately 35% docosahexaenoic acid (DHA)(in total more than 90% omega-3 fatty acids) which is used in Example 3 to prepare the astaxanthin diester, is only one example and shall not be considered as limiting for the invention. A person skilled in the art will understand that other concentrates of omega-3 fatty acids, e.g. concentrates containing less than 90% omega-3 fatty acids, might be used for preparing a astaxanthin diester giving similar results as those shown in the examples. Astaxanthin diesters esterified with carboxylic acids from marine oils containing omega-3 carboxylic acids or prepared from concentrates of omega-3 fatty acids comprising a total amount of EPA and DHA from 18 to 100%, preferentially from 40 to 100%, are covered by this invention. More precisely astaxanthin diesters prepared from concentrates of omega-3 fatty acids comprising an amount of EPA from 8 to 98%, preferentially from 25 to 98%, and an amount of DHA from 8 to 98%, preferentially from 15 to 98%, are covered by this invention.

Example 2 demonstrates that a diester with a short chain carboxylic acid with enzymes from salmon intestines also gives faster hydrolysis to free astaxanthin than a diester with palmitic acid. Thus such a diester will also be suitable as a pigment with high stability and enhanced biological uptake compared to commercial pigment formulations. In Example 2, we used decanoic acid. Other short chain carboxylic acids will be carboxylic acids with a chain length C1–C12. For the person skilled in the art, it is evident that these acids can be both saturated and unsaturated.

Furthermore, the person skilled in the art will see that the invented astaxanthin diester might be stabilised in the same way as commercial astaxanthin pigments, i.e. by means of gelatine-matrix. The amount of gelatine-matrix relative to the amount of pigment may be less for the invented pigment than what is needed to stabilise commercial pigments. Alternatively or additionally the invented pigment might be stabilised by antioxidants and/or by urea as described in our Norwegian patent application no. 19983050.

For a person skilled in the art it is obvious that a fatty acid diester of astaxanthin is more fat soluble than free astaxanthin. This is of course an advantage by the present invention because the pigment will be easier to formulate in the fish feed which is rich in fat.

Astaxanthin can be produced from microbial sources. Typical examples of promising microbial astaxanthin sources are the yeast *Phalli rhodozyma* and the alga *Haematococcus pluvialis*. *Phalli rhodozyma* has astaxanthin in free form, while *Haematococcus pluvialis* astaxanthin is present mainly (87%) as diesters (Johnson, E. A. and An, G-H. 1991. Astaxanthin from microbial sources. *Cit. Rev. Biotechnol.* 11(4):297.) For the person skilled in the art it is obvious that based on the present invention, increased bioavailability of astaxanthin diester from microbial sources can be obtained by choosing microbial strain, and/or by feeding with suitable fatty acids, or precursors for such fatty acids, or by choosing other suitable fermentation conditions, so that the astaxanthin diester that is produced contain omega-3 fatty acids and/or short chain carboxylic acids.

What is claimed is:

1. A pigment comprising a diester of astaxanthin prepared with a carboxylic acid, wherein the carboxylic acid is a concentrate of an omega-3 fatty acid comprising a total amount of all cis C20:5 n3 eicosapentaenoic acid (EPA) and/or all cis C22:6 n3 docosahexaenoic acid (DHA) from 18 to 100%.

2. A pigment according to claim 1, wherein the omega-3 fatty acid comprises a total amount of all cis C20:5 n3 eicosapentaenoic acid (EPA) and/or all cis C22:6 n3 docosahexaenoic acid (DHA) from 40 to 100%.

3. A pigment according to claim 1, wherein the omega-3 fatty acid comprises an amount of all cis C20:5 n3 eicosapentaenoic acid (EPA) from 8 to 98% and/or an amount of all cis C22:6 n3 docosahexaenoic acid (DHA) from 8 to 98%.

4. A pigment according to claim 1, wherein the omega-3 fatty acid comprises an amount of all cis C20:5 n3 eicosapentaenoic acid (EPA) from 25 to 98% and/or an amount of all cis C22:6 n3 docosahexaenoic acid (DHA) from 15 to 98%.

5. A pigment according to claim 1, wherein the omega-3 fatty acid comprises approximately 50% all cis C20:5 n3 eicosapentaenoic acid (EPA) and approximately 35% all cis C22:6 n3 docosahexaenoic acid (DHA).

6. A feed for salmonides comprising 25–70% by weight of proteins, 5–60% by weight of lipids, 0–40% by weight of carbohydrates, pigment and 0–15% by weight of one or more additional components, wherein the pigment is a diester of astaxanthin prepared with a concentrate of an omega-3 fatty acid comprising a total amount of all cis C20:5 n3 eicosapentaenoic acid (EPA) and/or all cis C22:6 n3 docosahexaenoic acid (DHA) from 18 to 100%.

7. A feed according to claim 6, wherein the additional components are selected from the group consisting of fillers, adhesives, preservatives, vitamins and minerals.

8. A feed according to claim 6, wherein the omega-3 fatty acid comprises a total amount of all cis C20:5 n3 eicosapentaenoic acid (EPA) and/or all cis C22:6 n3 docosahexaenoic acid (DHA) from 40 to 100%.

9. A feed according to claim 6, wherein the omega-3 fatty acid comprises an amount of all cis C20:5 n3 eicosapentaenoic acid (EPA) from 8 to 98% and/or an amount of all cis C22:6 n3 docosahexaenoic acid (DHA) from 8 to 98%.

10. A feed according to claim 6, wherein the omega-3 fatty acid comprises an amount of all cis C20:5 n3 eicosapentaenoic acid (EPA) from 25 to 98% and/or an amount of all cis C22:6 n3 docosahexaenoic acid (DHA) from 15 to 98%.

11. A feed according to claim 6, wherein the omega-3 fatty acid comprises approximately 50% all cis C20:5 n3 eicosapentaenoic acid (EPA) and approximately 35% all cis C22:6 n3 docosahexaenoic acid (DHA).

12. A method for pigmentation of salmonides, which comprises administering a diester of astaxanthin prepared with an omega-3 fatty acid comprising a total amount of all cis C20:5 n3 eicosapentaenoic acid (EPA) and/or all cis C22:6 n3 docosahexaenoic acid (DHA) from 18 to 100% to the salmonides.

13. A method of feeding salmonides which comprises incorporating a diester of astaxanthin prepared with an omega-3 fatty acid comprising a total amount of all cis C20:5 n3 eicosapentaenoic acid (EPA) and/or all cis C22:6 n3 docosahexaenoic acid (DHA) from 18 to 100% as a pigment in feed for salmonides.

* * * * *